United States Patent [19]

Sugiura et al.

[11] Patent Number: 5,362,101
[45] Date of Patent: Nov. 8, 1994

[54] AIR BAG DEVICE

[75] Inventors: Atsushi Sugiura, Toyota; Masakazu Hashimoto, Okazaki, both of Japan

[73] Assignee: Toyota Jidosha Kabushiki Kaisha, Toyota, Japan

[21] Appl. No.: 109,465

[22] Filed: Aug. 20, 1993

Related U.S. Application Data

[63] Continuation of Ser. No. 849,590, Mar. 11, 1992, abandoned.

[30] Foreign Application Priority Data

Mar. 12, 1991 [JP] Japan .................................. 3-46829

[51] Int. Cl.$^5$ ................................................ B60R 21/20
[52] U.S. Cl. .............................. 280/743 A; 280/728 A
[58] Field of Search ........... 280/728 R, 728 A, 730 R, 280/733, 743 A

[56] References Cited

U.S. PATENT DOCUMENTS

| | | | |
|---|---|---|---|
| 3,879,056 | 4/1975 | Kawashma et al. | 280/743 |
| 3,879,057 | 4/1975 | Kawashima et al. | 280/743 |
| 3,891,272 | 6/1975 | Takada | 280/743 |
| 4,186,941 | 2/1980 | Scholz et al. | 280/743 |
| 4,887,842 | 12/1989 | Sato | 280/743 |
| 5,048,863 | 9/1991 | Henseler et al. | 280/743 |

FOREIGN PATENT DOCUMENTS

| | | |
|---|---|---|
| 2722551 | 5/1977 | Germany . |
| 1125753 | 8/1989 | Japan . |
| 2149348 | 12/1990 | Japan . |

*Primary Examiner*—Kenneth R. Rice
*Assistant Examiner*—Paul N. Dickson
*Attorney, Agent, or Firm*—Cushman, Darby & Cushman

[57] ABSTRACT

An air bag device is provided which includes:

a first restraining member, of which one end is attached to an inflator side inside the air bag body and the other end is secured to the occupant side of the air bag body, and which at first restrains the air bag body from being inflated toward the occupant past a first predetermined amount in the inflation of the bag body; and a second restraining member to restrain the air bag body from being inflated toward the occupant past a second predetermined amount greater than the first predetermined amount when a tensile force exceeding a predetermined value acts on the first restraining member in the inflation of the air bag body.

The air bag body is at first blocked from inflating toward the occupant for a desired inflation shape, followed by inflation again of the bag body toward the occupant to provide the final desired inflation shape.

6 Claims, 16 Drawing Sheets

AIR BAG DEVICE

This is a continuation of application Ser. No. 07/849,590, filed on Mar. 11, 1992, now abandoned.

BACKGROUND OF THE INVENTION

1. Field of the Invention

The present invention relates to an air bag device attached to an instrument panel, a steering wheel or the like of a vehicle.

2. Description of the Related Art

In recent years, an air bag device has been proposed as a device for protecting a vehicle occupant in an emergency.

This air bag device is designed to protect the occupant in such a way that an air bag body for the air bag device is filled with gas during a sudden deceleration of the vehicle, thereby expanding the air bag body in front of or toward the side of the occupant.

FIG. 16 shows one example of the air bag device. Inside an air bag body 70 a strap 72 is provided which can be broken by a tensile force larger than a predetermined value (Japanese Utility Model Application Laid-Open No. 1-125753). One end 72A of the strap 72 is attached to the occupant side 70A of the air bag body 70 via a plate 74. The other end 72B thereof is secured by bolts or the like to a case 76 which contains the air bag body. Accordingly, when the air bag body 70 is inflated, the strap 72 blocks the inflation of the air bag body 70 toward the occupant. As shown in FIG. 16, this directs the inflation of the air bag body 70 perpendicular to the direction of the occupant (in the direction of an arrow A in FIG. 16.) Pressure inside the air bag body 70 is then increased until the tensile force applied to the strap 72 reaches the predetermined value. The strap 72 then breaks so as to inflate the air bag body 70 in a desired direction (for example, in an upward direction of the vehicle), as illustrated in FIG. 17.

However, in this air bag device, there is no specific means for finally forming the air bag body 70 into a desired inflation shape after the strap 72 is broken. This causes an inconvenience in that it is difficult to provide a desirable final inflation shape of the air bag body 70.

SUMMARY OF THE INVENTION

With the fact above taken into account, it is an object of the present invention to provide an air bag device that can at first prevent an air bag body from inflating toward an occupant until a desired inflation shape thereof is obtained, followed by inflation again of the air bag body toward the occupant to provide the final desired inflation shape.

In a first aspect of the present invention, the air bag device includes at least one strap, of which one end is attached to an inflator side inside the air bag body and the other end secured to the occupant side of the air bag body so that the air bag body may be inflated in a progressive manner; and the strap is partly provided with a extension portion which extends the strap from a first to a second length when a tensile force exceeding a predetermined value acts on the strap during the inflation of the air bag body.

In a second aspect of the present invention, the air bag device includes the strap, of which one end is attached to the inflator side inside the air bag body and the other end secured to the occupant side of the air bag body so that the air bag body may be inflated in stages, and the strap is formed of no less than two types of filamentous bodies of different lengths; the air bag device comprising a provision in which, when tensile force larger than the predetermined value acts on a shorter filamentous body during the inflation of the air bag body, the attachment of the shorter filamentous body to the occupant side is released and a longer filamentous body controls the inflation of the air bag body toward the occupant.

In the first aspect of the invention, when the inflator is operated to initiate the inflation of the air bag body, the strap will extend to a first length by the inflation of the air bag body. Accordingly, the strap prevents the air bag body from being inflated toward the occupant by a predetermined amount, thus directing the inflation in the direction which is not blocked so as to provide the desired inflation shape. Furthermore, when pressure inside the air bag body is increased and the tensile force acting on the strap reaches the predetermined value, the extension portion extends the strap to a second length. This allows the air bag body to be inflated to the desired shape, followed by further inflation toward the occupant, with the desired shape substantially retained, so that the air bag body can finally be formed into the desired inflation shape by the strap which is now of the second length.

In the second aspect of the invention, when the inflator is operated to initiate the inflation of the air bag body, the shortest filamentous body will be forced to extend to its maximum length in response to the inflation of the air bag body. Accordingly, the shortest filamentous body prevents the air bag body from being inflated toward the occupant, thus directing this inflation in the direction which is not blocked so as to provide the desired inflation shape. Furthermore, a connection between the shortest filamentous body and the air bag body will be released when the pressure inside the air bag body is increased and the tensile force acting on the shortest filamentous body reaches the predetermined value. This will cause the air bag body to inflate again toward the occupant after completing inflation of the desired shape, followed by the desired inflation shape produced by the shortest filamentous body; this continual process will finally provide the desired inflation shape through desired inflation forms in sequence.

In the present invention, such construction as given in the EMBODIMENTS below provides an improved operation which allows the air bag body to be at first blocked from inflating toward the occupant for the desired inflation form, followed by inflation again of the air bag body toward the occupant to provide the final desired inflation shape.

DESCRIPTION OF THE PREFERRED EMBODIMENTS

Figure 1:
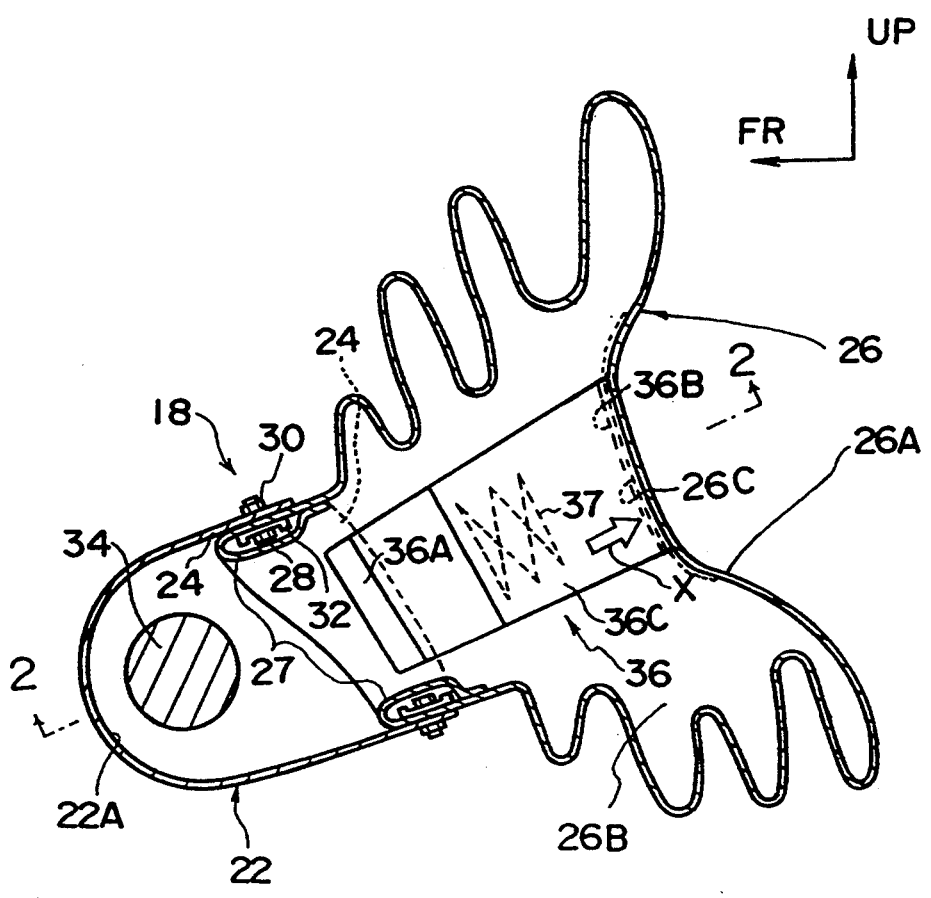
FIG. 1 is a sectional view from the side of a vehicle body, showing the initial inflation of an air bag body for an air bag device according to a first embodiment of a first aspect of the present invention.

A first embodiment of a first aspect of the present invention is described with reference to FIGS. 1 to 7. Note that arrows FR and UP in the drawings represent the respective directions of the front and the top of a vehicle body.

Figure 7:
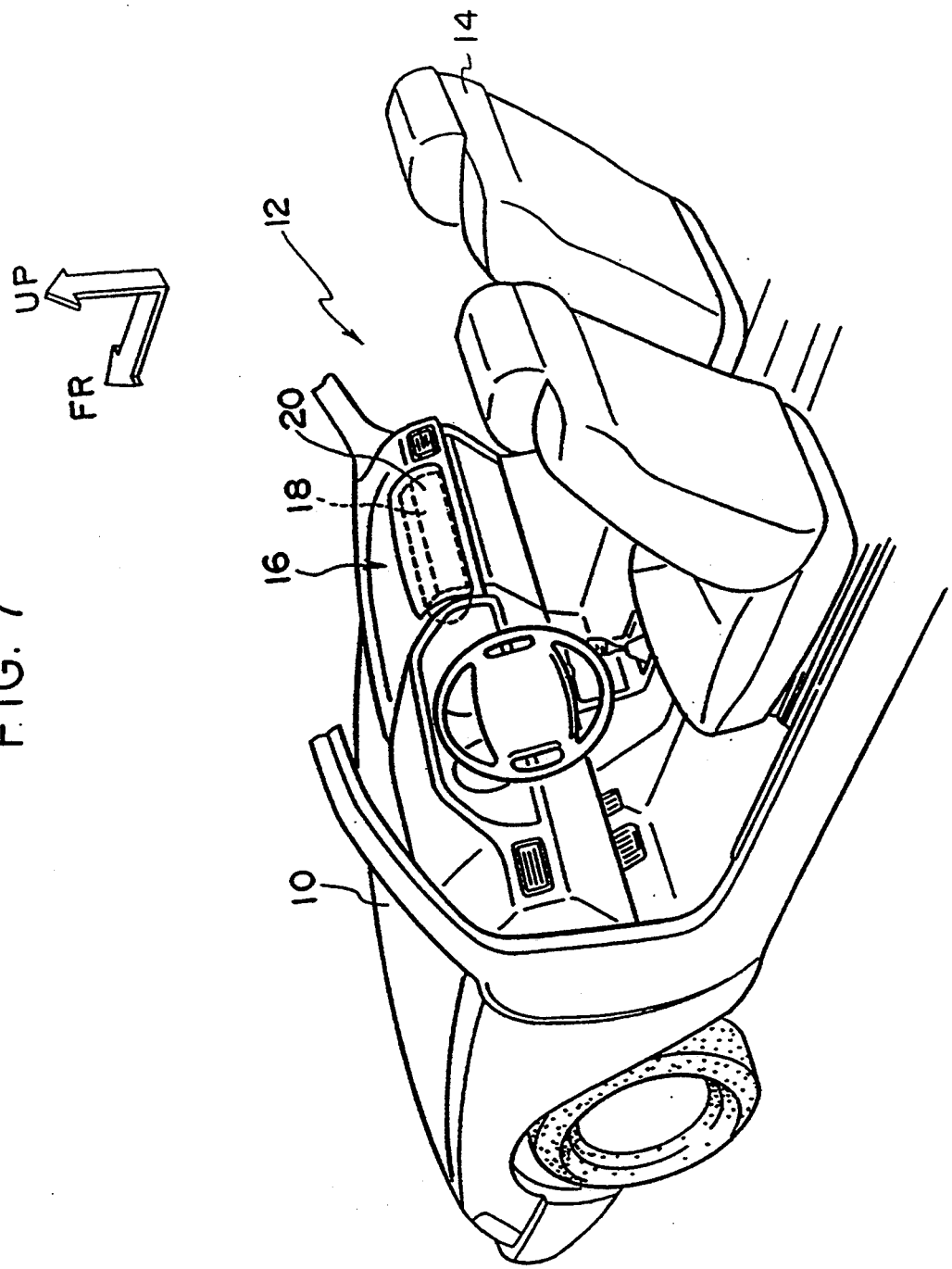
FIG. 7 is a perspective illustration from the rear of the vehicle body, showing an installment panel to which the air bag device according to the first embodiment of the first aspect of the present invention is applied.

As shown in FIG. 7, a vehicle body 10 is provided with an installment panel 16 disposed in front of the seat 14 next to the driver in a vehicle interior 12. The installment panel 16 is formed of a PP series resin material. An air bag device 18 is disposed behind the installment panel 16. The air bag device 18 extends lengthwise and in the transverse direction of the vehicle. A portion of the panel 16 opposite the air bag device 18 is a rectangular air bag cover portion 20 extending lengthwise and in the transverse of the vehicle.

As shown in FIG. 1, a case 22 of the air bag device 18 is substantially U-shaped in cross-section when viewed from the transverse direction of the vehicle. The case 22 is formed with an opening 24 sloping upwards toward the rear of the vehicle. Opening flange portions 27 of the air bag body 26 are secured with bolts 28 and nuts 30 to the inner circumference of the opening 24. Between the opening flange portions 27 of the bag body 26 and the bolts 28, retainers 32 extending lengthwise along the opening 24 of the case 22 are also provided, which seals connections between the opening 24 of the case 22 and the opening flange portions 27 of the bag body 26. A main cloth 26A made from pieces cut into rectangular cloths and circular side surface cloths 26B are sewed together at circumferential ends 26C thereby forming the air bag body 26 into an air bag shape.

In the vicinity of a base 22A inside the case 22, a cylindrical inflator 34 is also mounted along the transverse direction of the vehicle. The inflator 34 is filled with a gas-generating material that is provided with an igniting means. Thus, when the speed of the vehicle body 10 is suddenly reduced by a degree greater than a predetermined value, an acceleration sensor (not shown) is operated to ignite the gas-generating material by means of the igniting means so as to initiate combustion. The resulting gas causes the air bag body 26, which is contained in a folded state adjacent the opening 24 of the case 22, to inflate and break through the air bag cover portion 20 of the installment panel 16 into the vehicle interior.

Figure 2:
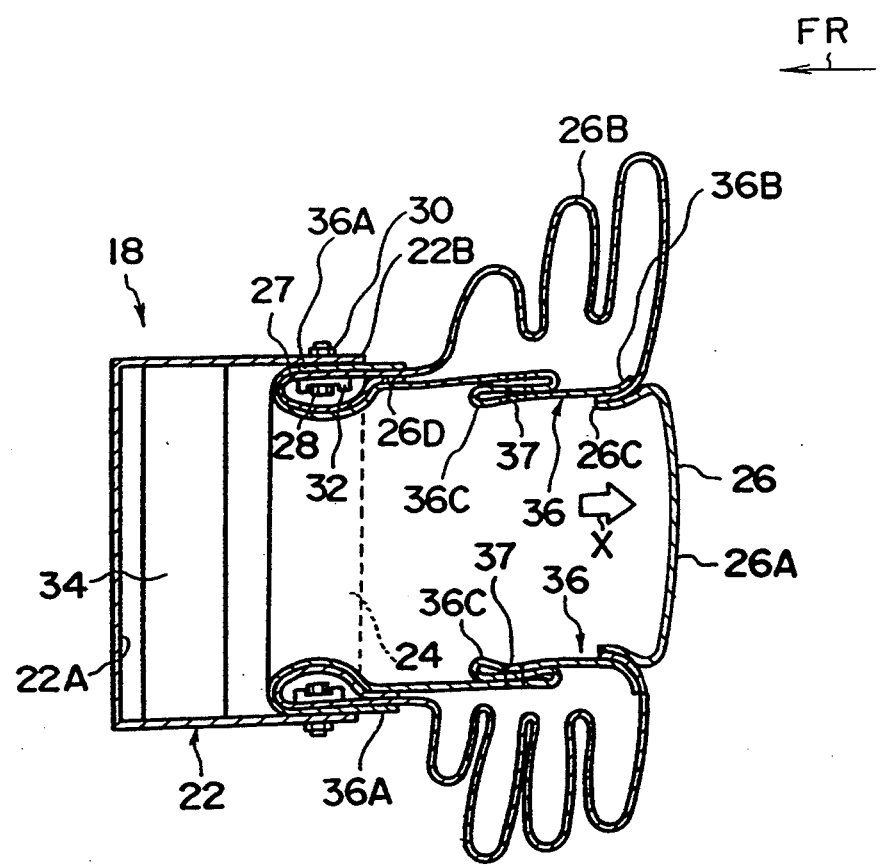
FIG. 2 is a sectional view taken along line 2—2 of FIG. 1.

As illustrated in FIG. 2, the air bag body 26 is provided therein with straps 36 which are a pair of band shaped fabrics. One ends 36A of the straps 36 are turned up along the opening flange portions 27 of the air bag body 26. The end 36A are secured between the retainers 32 and side wall portions 22B of the case 22 by the bolts 28 and nuts 30. The other end 36B of the straps 36 are sewed onto the circumferential ends 26C of the main cloth 26A and the side surface cloths 26B of the air bag body 26.

Folded portions 36C acting as extension portions are also formed at a substantially central portion of the straps 36. The straps 36 are folded a given number of times into folded portions 36C, of which substantially entire areas are sewed up at a predetermined intensity with sewing thread 37. Accordingly, when a tensile force in excess of a predetermined value acts upon the straps 36, the straps 36 will extend from the first length (shown in FIG. 2) to the second length (shown in FIG. 6) by cutting of the thread 37.

Operations produced by this embodiment will now be described.

When the vehicle body 10 suddenly decelerates, the inflator 34 generates gas to fill the air bag body 26, whereby the air bag body 26 rapidly inflates outward and breaks through the air bag cover portion 20 of the installment panel 16 and into the vehicle interior.

Figure 3:
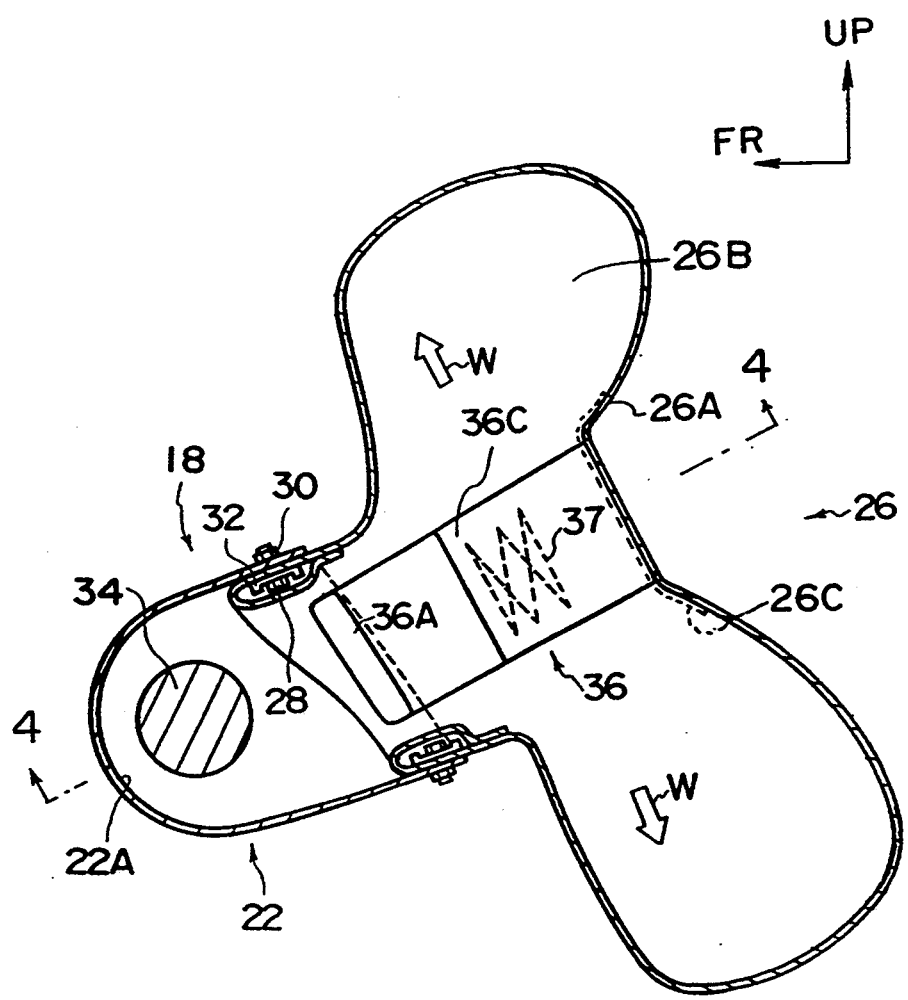
FIG. 3 is a sectional view from the side of the vehicle body, illustrating the interim inflation of the air bag body for the device according to the first embodiment of the first aspect of the present invention.
Figure 4:
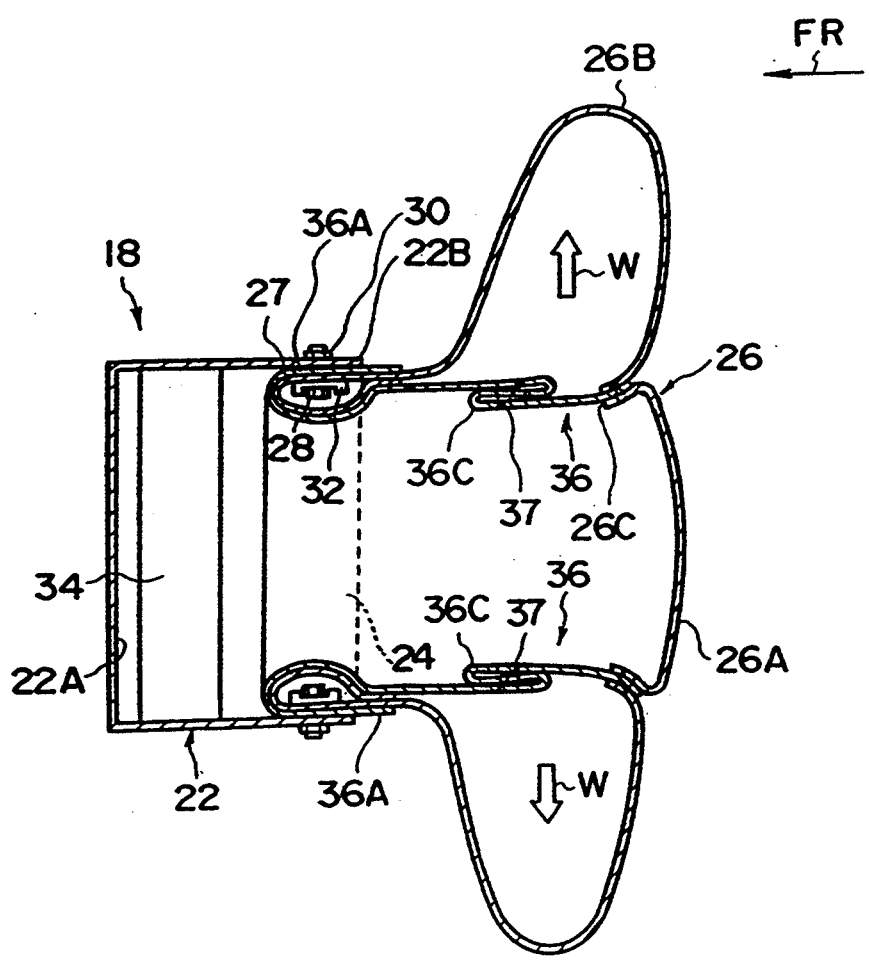
FIG. 4 is a sectional view taken along line 4—4 of FIG. 3.
Figure 5:
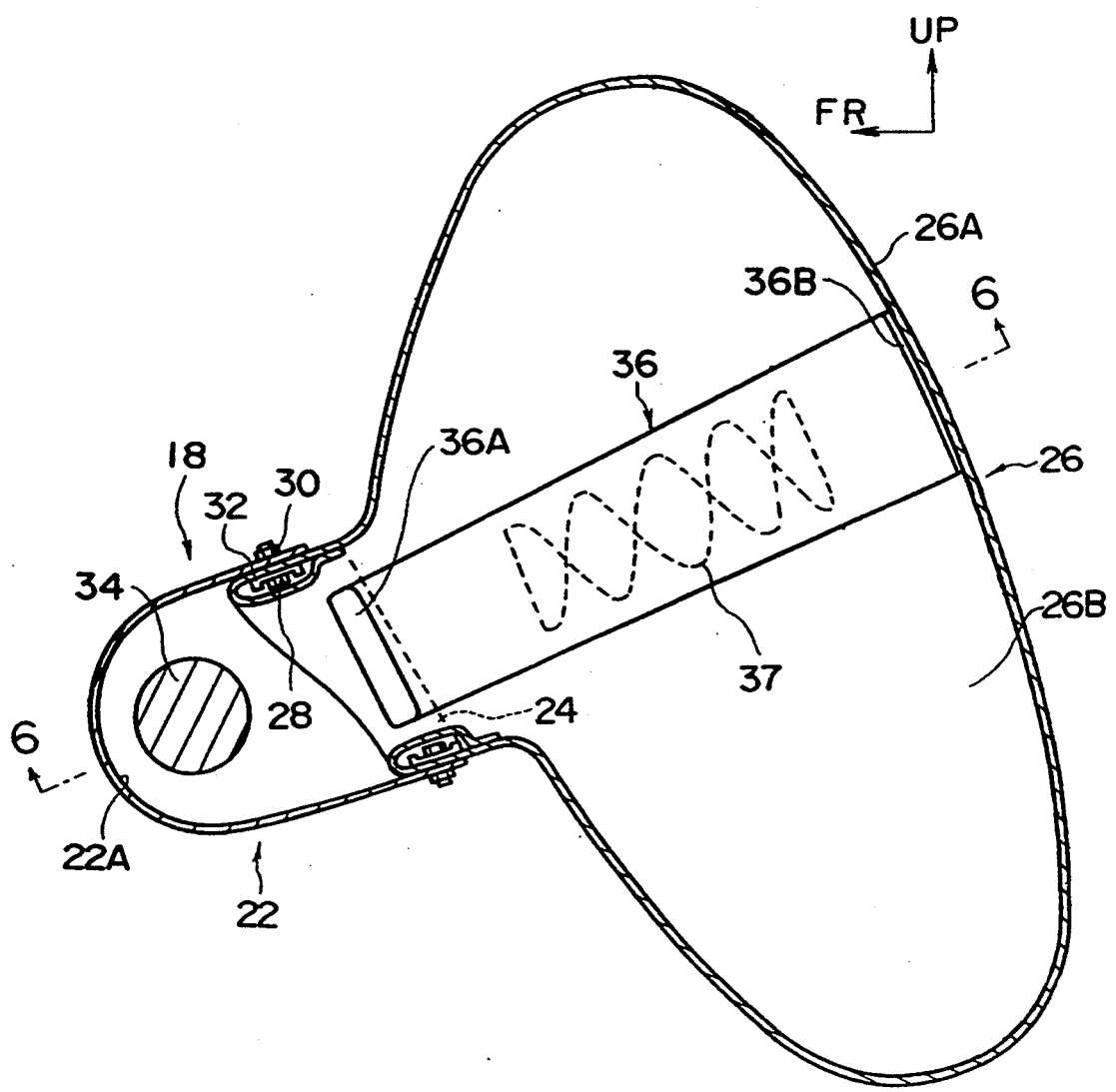
FIG. 5 is a sectional view from the side of the vehicle body, illustrating the final inflation shape of the air bag body for the air bag device according to the first embodiment of the first aspect of the present invention.
Figure 6:
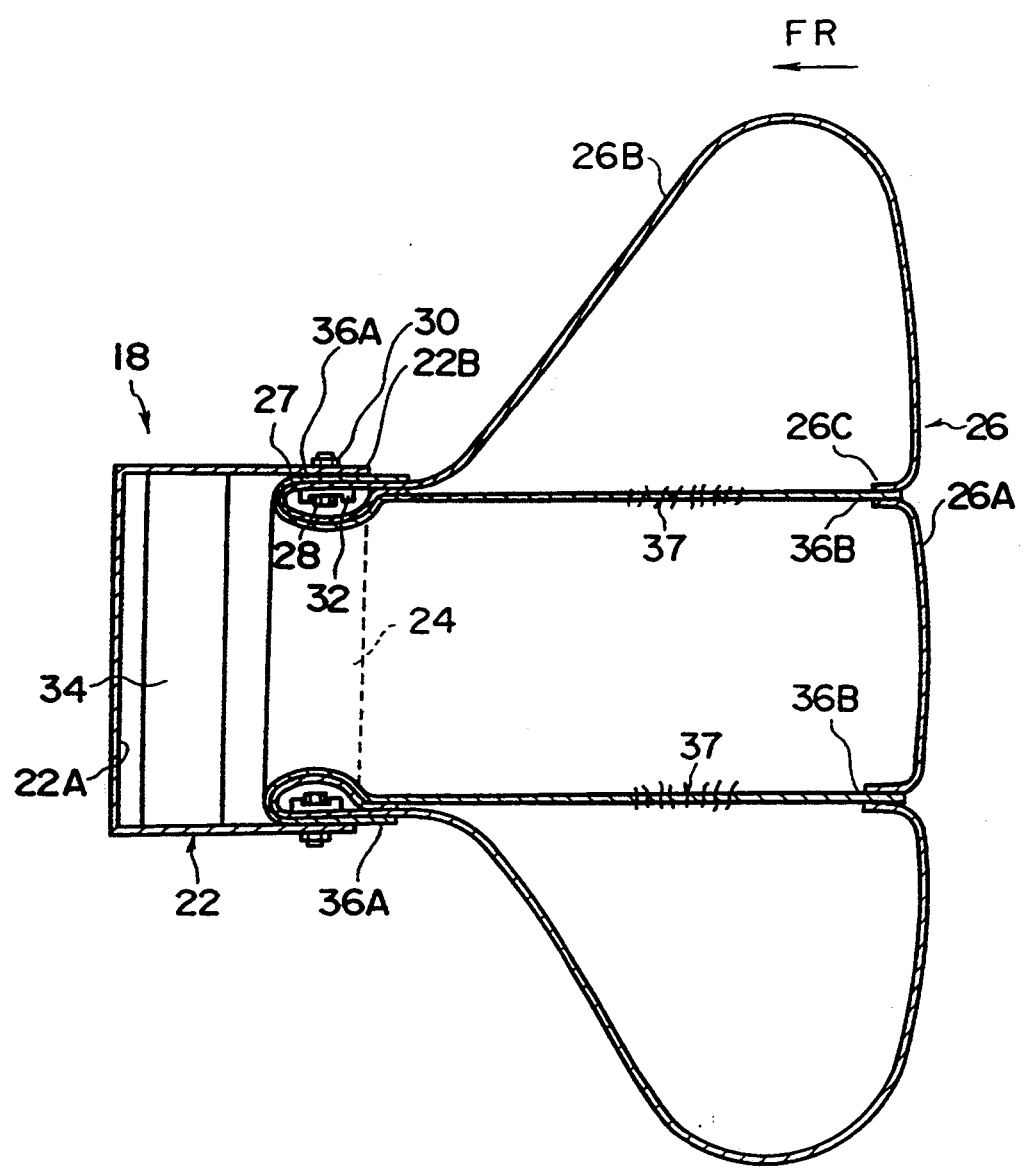
FIG. 6 is a section view taken along line 6—6 of FIG. 5.

When the air bag body 26 begins initiating, the straps 36 will extend to the first length (shown in FIG. 1 and FIG. 2). Thus, the straps 36 restrain the air bag body 26 from inflating toward the occupant (in the direction of arrows Xs in FIG. 1 and FIG. 2) but instead direct this inflation perpendicularly in relation to the direction of the occupant (shown by arrows Ws in FIGS. 3 and 4) thereby providing the desired inflation shape (as illustrated in FIG. 3 and FIG. 4). Furthermore, the sewing thread 37 of the folded portions 36C will break when the inner pressure of the air bag body 26 is increased and the tensile force acting on the straps 36 reaches the predetermined value. This extends the straps 36 to the second length (shown in FIG. 5 and FIG. 6). This causes the air bag body 26 to be inflated again toward the occupant after inflation shapes illustrated in FIG. 3 and FIG. 4 are completed, thereby allowing the air bag body 26 to finally be formed into the desired inflation shapes (shown in FIG. 5 and FIG. 6) by the straps 36 which are now of the second length.

Figure 8:
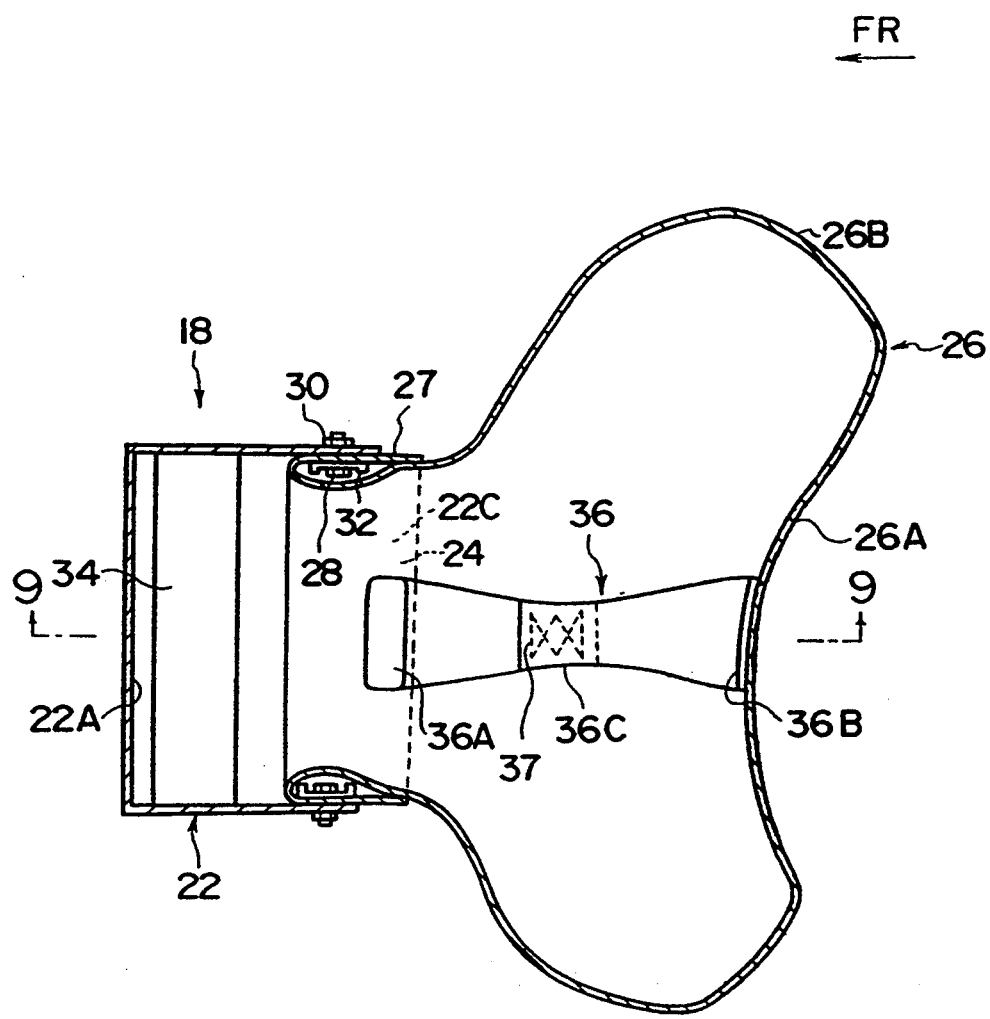
FIG. 8 is a sectional illustration from the top of the vehicle body, showing the interim inflation of the air bag body for the air bag device according to a second embodiment of the first aspect of the present invention.
Figure 9:
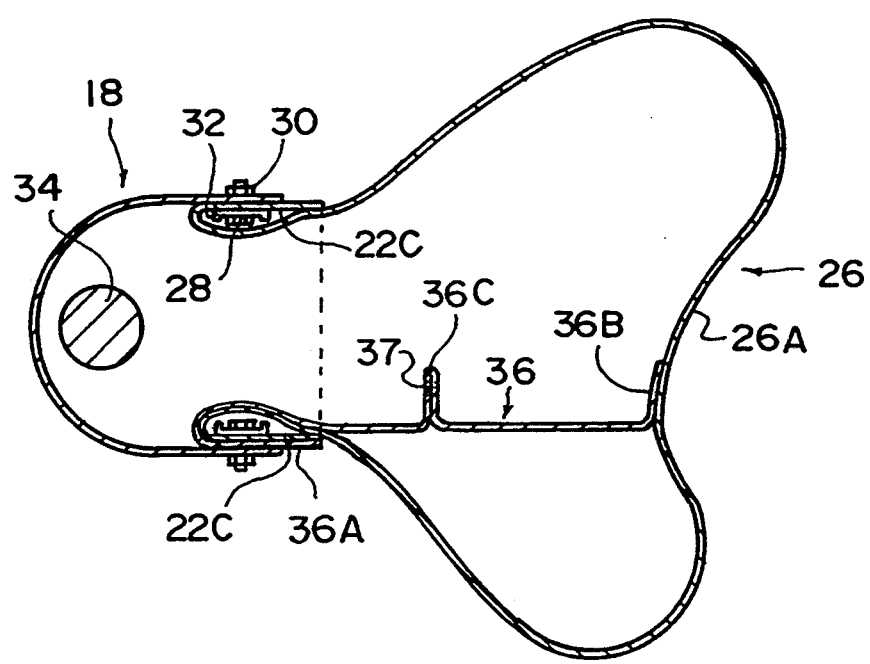
FIG. 9 is a sectional view taken along line 9—9 of FIG. 8.
Figure 10:
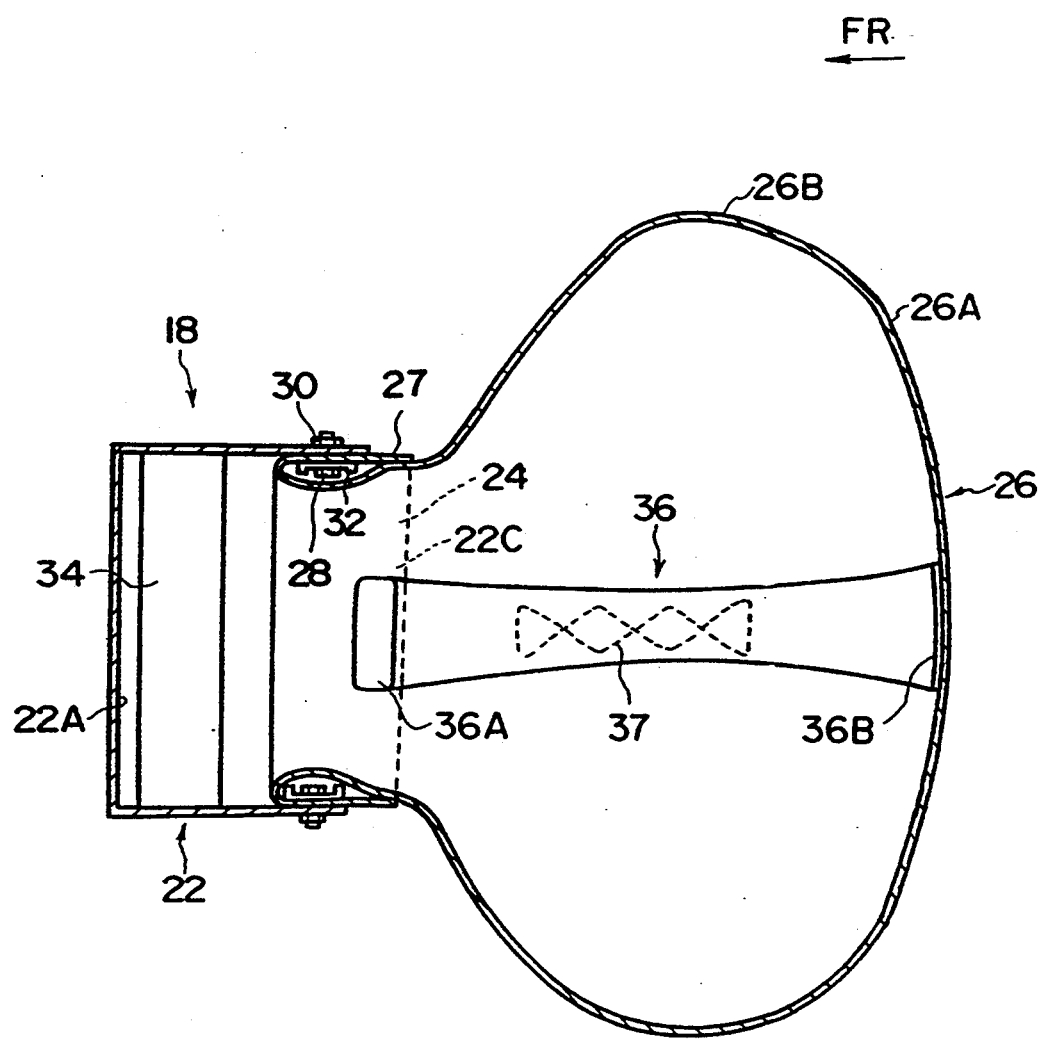
FIG. 10 is a sectional view from the top of the vehicle body, illustrating the final inflation shape of the air bag body for the air bag device according to the second embodiment of the first aspect of the present invention.
Figure 11:
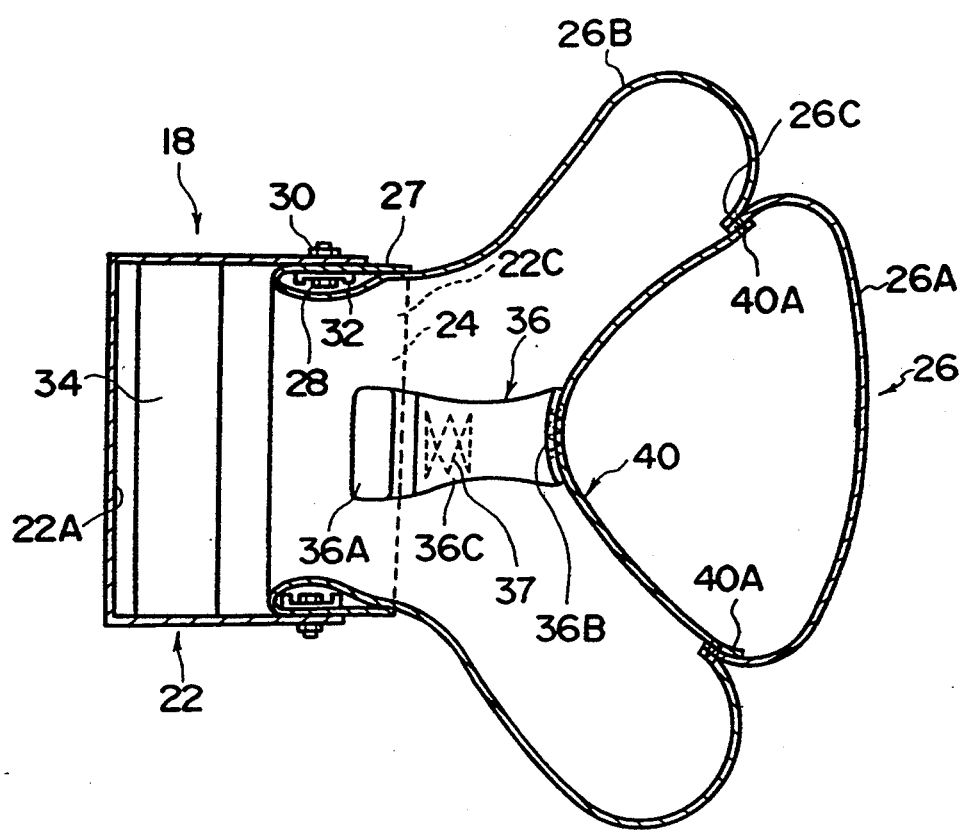
FIG. 11 is a sectional view from the top of the vehicle body, showing the interim inflation of the air bag body for the air bag device according to a third embodiment of the first aspect of the present invention.
Figure 12:
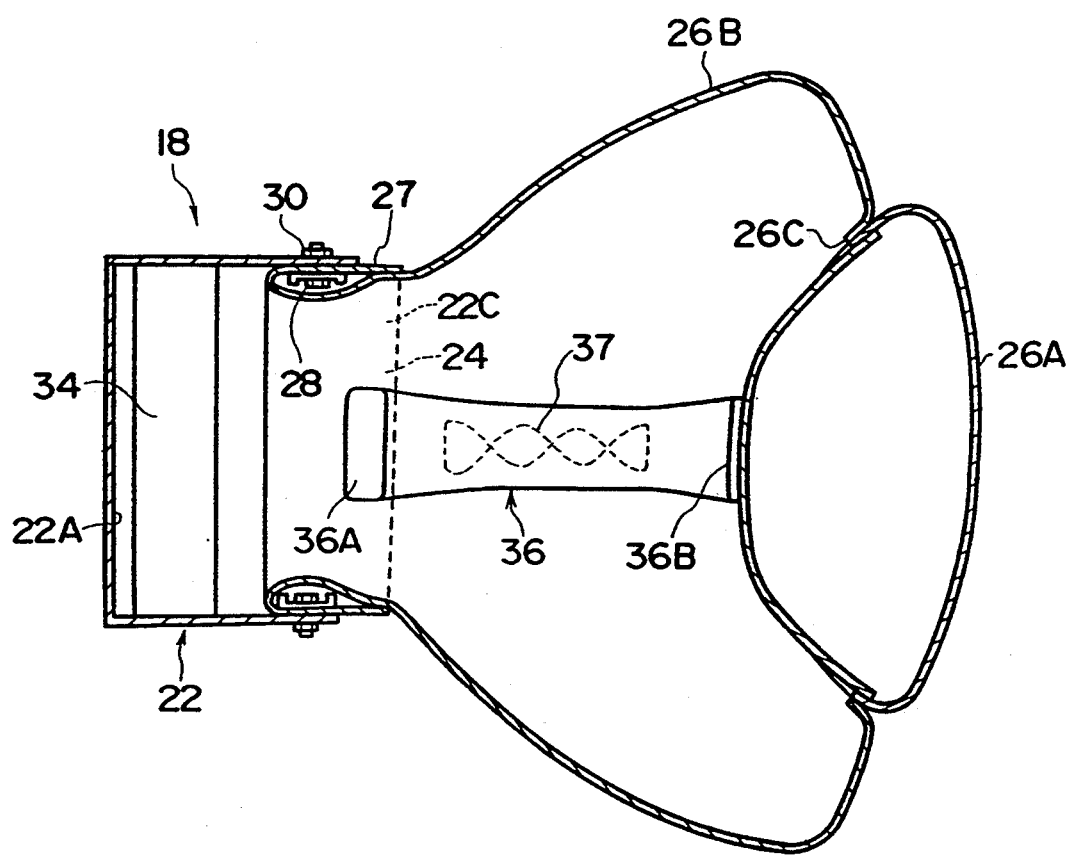
FIG. 12 is a cross-section view from the top of the vehicle body, illustrating the final inflation shape of the air bag body for the air bag device according to the third embodiment of the first aspect of the invention.

In this embodiment, the ends 36A of the straps 36 are attached to the side wall portions 22B of the case 22, whereas the ends 36B thereof are secured to the circumferential ends 26C formed by the main cloth 26A and the side surface cloths 26B of the air bag body 26. Alternatively, as a second embodiment of the first aspect of the invention, shown in FIGS. 8, 9, and 10, it is acceptable that one end 36A of the strap 36 is attached to either an upper or lower wall portion 22C of the opening 24 of the case 22, whereas the other end 36B of the strap 36 is sewed onto a substantially central portion of the main cloth 26A of the air bag body 26. As a third embodiment of the first aspect of the invention, illustrated in FIG. 11 and FIG. 12, it is also permissible that the one end 36A of the strap 36 is secured to either the upper or lower wall portion 22C of the opening 24 of the case 22, whereas the other end 36B thereof is sewed onto a substantially central portion of a belt 40 in which opposite ends 40A are sewed onto the circumferential ends 26C of the air bag body 26.

Figure 13:
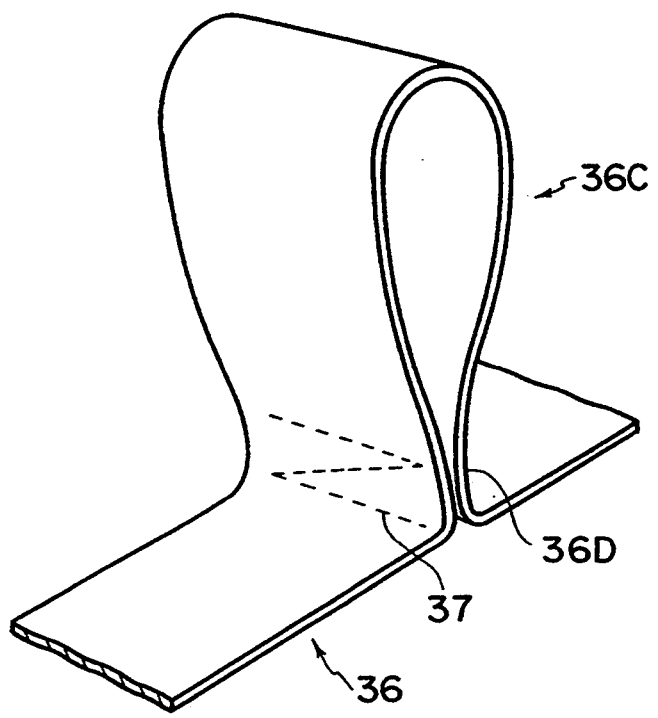
FIG. 13 is a perspective view showing a folded portion of a strap in the air bag body for the air bag device according to a modification of the embodiments of the first aspect of the present invention.

In those embodiments, the straps 36 are folded a predetermined number of times. Essentially all regions of the folded portions 36C are sewed with the sewing thread 37, with the straps 36 folded up. Alternatively, as seen in FIG. 13, it is also recommended that the strap 36 be folded into two parts at a substantially central portion thereof, of which a neck portion 36D alone is sewed with the sewing thread 37; or, the folded portion 36C may be set with an adhesive instead of sewing by way of the thread 37.

An embodiment of a second aspect of the invention will be now described with reference to FIGS. 14 and 15. Note that components identical to those described in the first aspect have been given the same reference numbers, by which relevant descriptions will be omitted.

Figure 14:
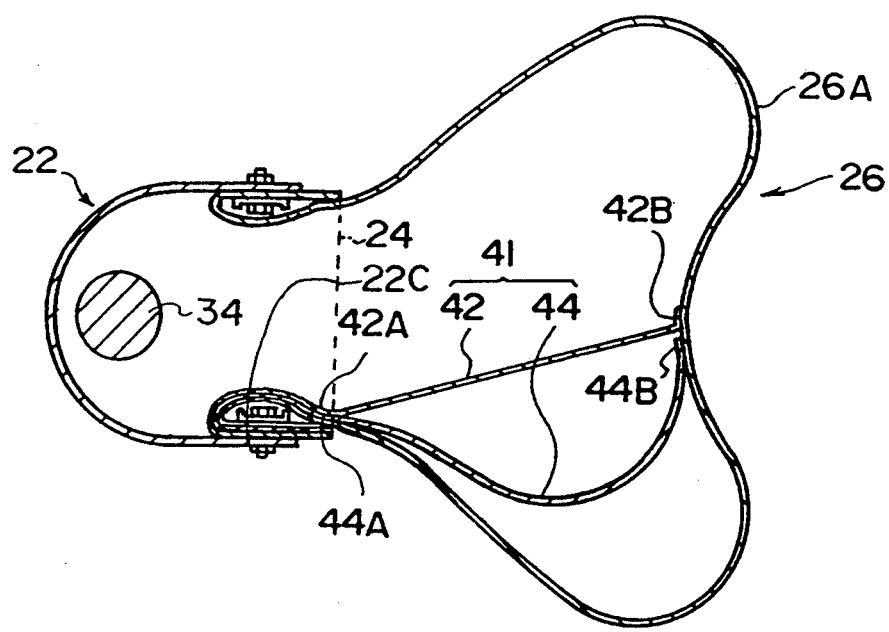
FIG. 14 is a sectional view from the side of the vehicle body, showing the interim inflation of the air bag body for the air bag device according to an embodiment of a second aspect of the present invention.
Figure 15:
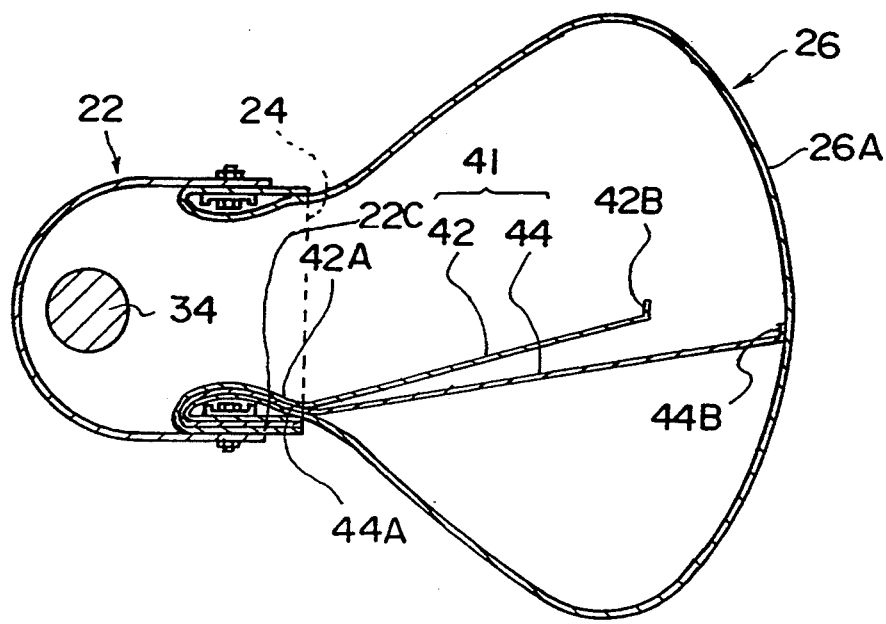
FIG. 15 is a sectional illustration from the side of the vehicle body, showing the final inflation shape of the air bag body for the air bag device according to the embodiment of the second aspect of the present invention.
Figure 16:
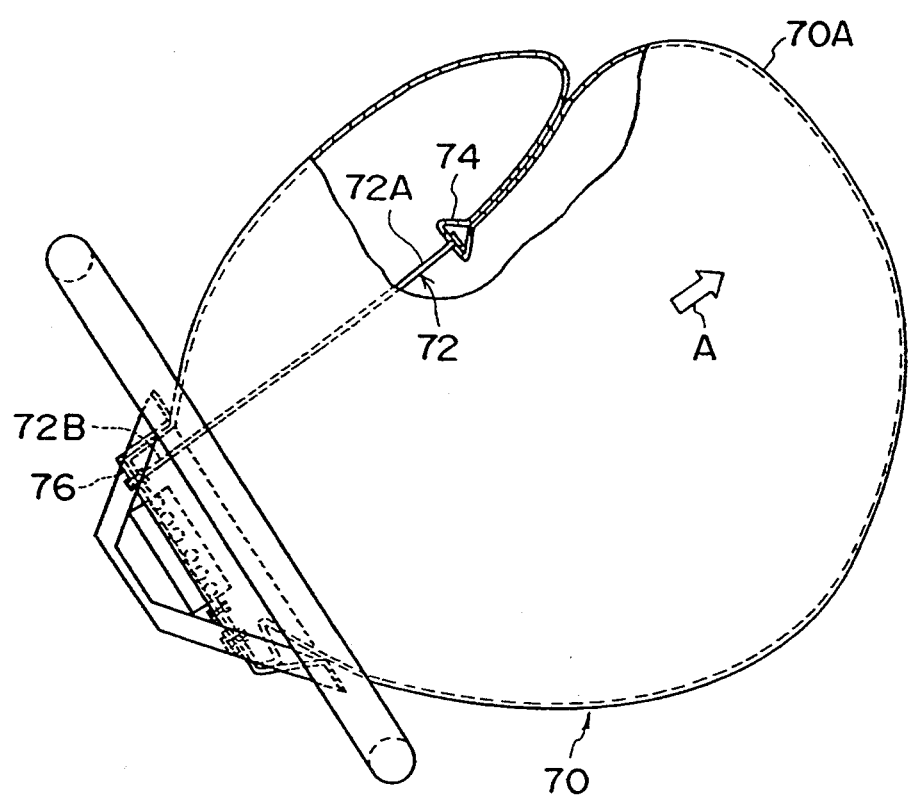
FIG. 16 is a sectional view from the side of the vehicle body, illustrating the initial inflation of the air bag body for the air bag device according to an example of the related art.
Figure 17:
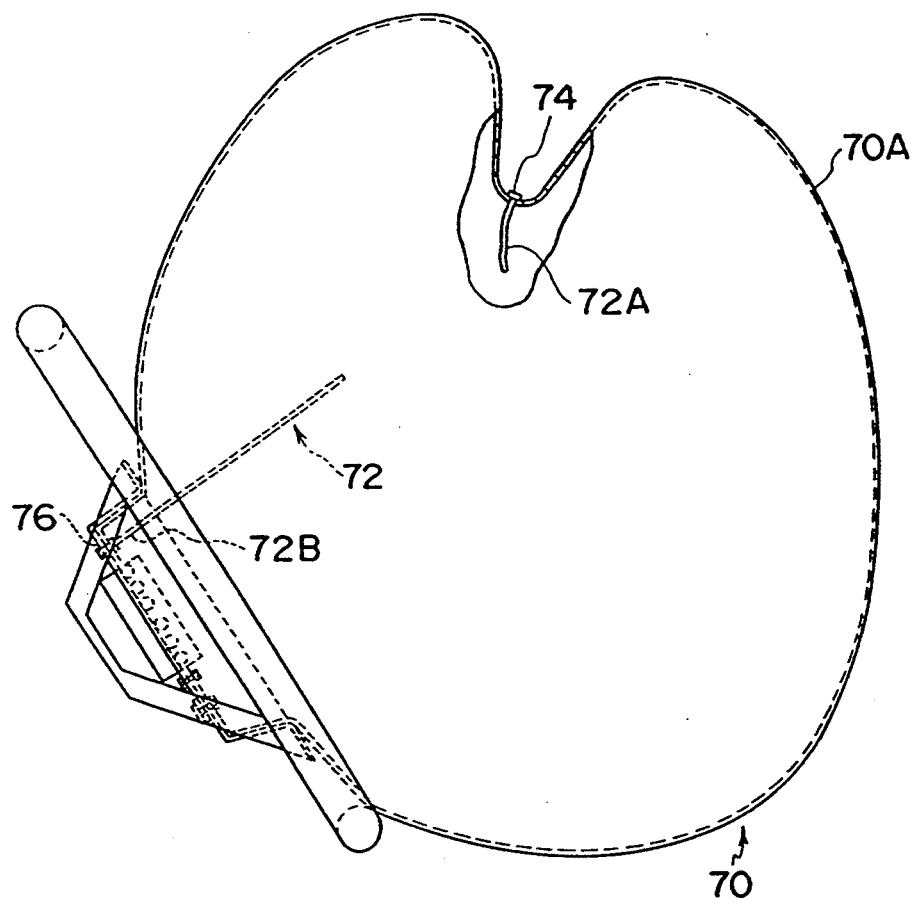
FIG. 17 is a sectional view from the side of the vehicle body, showing the interim inflation of the air bag body for the air bag device according to the example of the related art.

As shown in FIG. 14, in this embodiment, a strap 41 is comprised of a shorter 42 and a longer filamentous body 44 of which the latter is longer than the former; one end 42A and 44A of the respective filamentous bodies 42 and 44 are secured respectively to the lower wall portion 22C of the opening 24 of the case 22, with the other end 42B and 44B thereof sewed respectively onto a substantially central portion of the main cloth 26A of the air bag body 26.

Accordingly, when the air bag body 26 begins inflating, the shorter filamentous body 42 prevents the air bag body 26 from inflating toward the occupant and instead directs the inflation in the direction in which inflation is not blocked so as to provide the desired inflation shape, as illustrated in FIG. 14. Furthermore, when pressure inside the air bag body 26 increases and the tensile force acting on the shorter filamentous body 42 reaches the predetermined value, a stitch made at the end 42B of the shorter filamentous body 42 and the main cloth 26A will be released so that the longer filamentous body 44 is forced to extend to its maximum length, as illustrated in FIG. 15. This allows the air bag body 26 to inflate again toward the occupant after completing inflation of the desired shape so as to provide the final desired inflation shape (shown in FIG. 15).

Note that the strap 41 comprised of the shorter filamentous body 42 and the longer filamentous body 44 in this embodiment may also be alternatively formed of no less than two types of filamentous bodies of different lengths.

What is claimed is:

1. An air bag device for progressively inflating an air bag body, comprising:
    a first restraining means having one end attached to an inside of the air bag body at an inflator side thereof and another end secured to an occupant side of the air bag body for restraining the air bag body from being inflated toward an occupant past a first predetermined amount during inflation of the air bag body, said first restraining means being formed of a first filamentous body, and
    a second restraining means for restraining the air bag body from being inflated toward the occupant past a second predetermined amount greater than the first predetermined amount when a tensile force exceeding a predetermined value acts on said first restraining means during inflation of said air bag body, said second restraining means including a second filamentous body that is longer than said first filamentous body, one end of the second filamentous body being attached to the inflator side inside the air bag body and the other end thereof being secured to the occupant side of the air bag body,
    whereby, when said first restraining means restrains the air bag body from inflating toward the occupant side, the air bag body inflates in a direction orthogonal to the occupant side and thereafter, when a tensile force larger than the predetermined value acts on said first filamentous body during inflation of said air bag body, said first filamentous body is detached from the occupant side and the air bag body begins to inflate towards the occupant while a shape of the air bag body is maintained in the orthogonal direction, and said second filamentous body controls inflation of the air bag body toward the occupant.

2. An air bag device for progressively inflating an air bag body, comprising:
    at least one strap which allows the air bag body to progressively inflate, one end of the strap being attached to an inflator side of the air bag body and another end of the strap being secured to an occupant side of the air bag body,
    an extension portion provided on a portion of said strap, extending said strap from a first length to a second length when a tensile force larger than a predetermined value acts on said strap during inflation of said air bag body, and
    a belt provided inside said air bag body, opposite ends of said belt being sewed onto circumferential ends of the air bag body, and said one end of said strap being fitted to one of the top and bottom of the inflator side inside the air bag device, said other end of said strap being secured at a substantially central portion of said belt.

3. An air bag device for inflating an air bag body in a progression manner, comprising:
    at least two filamentous bodies each having one end attached to an inflator side of the device inside the air bag body and each having another end secured to an occupant side of the air bag body so that the air bag body may be progressively inflated, said filamentous bodies having different lengths so that one of said filamentous bodies is shorter than another said filamentous body, said shorter filamentous body restraining the air bag body from being inflated toward the occupant past a first predetermined amount, whereby, when said shorter filamentous body restrains the air bag body from inflating toward the occupant side, the air bag body inflates in a direction orthogonal to the occupant side and thereafter, when tensile force greater than a predetermined value acts on a shorter filamentous body of said filamentous bodies during inflation of the air bag body, the shorter filamentous body is detached from the occupant side and the air bag body begins to inflate towards the occupant while a shape of the air bag body is maintained in the orthogonal direction, and a longer filamentous body of said filamentous bodies controls inflation of the air bag body toward the occupant.

4. An air bag device according to claim 3, wherein said other ends of said filamentous bodies are attached with separately predetermined strengths at a substantially central portion of an inner surface of the air bag body toward the occupant side thereof.

5. An air bag device according to claim 3, wherein said other ends of said filamentous bodies are sewed with separately predetermined strengths into a substantially central portion of an inner surface of the air bag body toward the occupant side thereof.

6. An air bag device according to claim 3, wherein two said filamentous bodies are provided having different lengths.

* * * * *